(12) United States Patent
McAllister et al.

(10) Patent No.: US 10,157,523 B2
(45) Date of Patent: Dec. 18, 2018

(54) TELECOMMUNICATIONS SYSTEM FOR TRANSPORTING FACILITY CONTROL DATA AND WIRELESS COVERAGE INFORMATION

(71) Applicant: CommScope Technologies LLC, Hickory, NC (US)

(72) Inventors: Donald R. McAllister, Lynchburg, VA (US); Christopher Goodman Ranson, Concord, VA (US); Michael J. Williamson, Clayton, NC (US); Fred William Phillips, Forest, VA (US); Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 140 days.

(21) Appl. No.: 15/304,049

(22) PCT Filed: Oct. 22, 2014

(86) PCT No.: PCT/US2014/061820
§ 371 (c)(1),
(2) Date: Oct. 13, 2016

(87) PCT Pub. No.: WO2015/160380
PCT Pub. Date: Oct. 22, 2015

(65) Prior Publication Data
US 2017/0039828 A1 Feb. 9, 2017

Related U.S. Application Data

(60) Provisional application No. 61/980,631, filed on Apr. 17, 2014.

(51) Int. Cl.
*G08B 13/196* (2006.01)
*G08B 17/10* (2006.01)
(Continued)

(52) U.S. Cl.
CPC .......... *G08B 13/196* (2013.01); *G08B 17/10* (2013.01); *H04B 7/04* (2013.01); *H04W 24/02* (2013.01);
(Continued)

(58) Field of Classification Search
CPC combination set(s) only.
See application file for complete search history.

(56) References Cited

U.S. PATENT DOCUMENTS

| 2009/0067363 A1 | 3/2009 | Ruiz et al. |
| 2010/0067505 A1 | 3/2010 | Fein et al. |

(Continued)

OTHER PUBLICATIONS

European Patent Office, "Extended European Search Report from EP Application No. 14889675.6", "for Foreign Counterpart to U.S. Appl. No. 15/304,049", dated Nov. 13, 2017, Published in: EP.

(Continued)

*Primary Examiner* — Anand S Rao
*Assistant Examiner* — Samuel D Fereja
(74) *Attorney, Agent, or Firm* — Fogg & Powers LLC

(57) ABSTRACT

Certain features relate to configuring a distributed antenna system ("DAS") to interface with and manage components of facility control and monitoring systems while providing wireless communications in a cellular or public safety network. A communications module is configured for receiving facility control signals from facility control and monitoring centers and associated nodes and sensors. A signal processing module is configured to convert the facility control signals a format transportable in the DAS. The signal processing module is also configured to multiplex the facility control signals with mobile voice and data signals being transported in the DAS. The DAS configured to manage components of facility control and monitoring systems can route facility control signals to appropriate facility control centers or the nodes and sensors associated with the facility control centers.

16 Claims, 6 Drawing Sheets

(51) Int. Cl.
  *H04W 24/02* (2009.01)
  *H04B 7/04* (2017.01)
  *H04W 88/08* (2009.01)
  *H04W 52/02* (2009.01)

(52) U.S. Cl.
  CPC ...... *H04W 52/0251* (2013.01); *H04W 88/085* (2013.01); *Y02D 70/00* (2018.01); *Y02D 70/1242* (2018.01); *Y02D 70/1262* (2018.01); *Y02D 70/166* (2018.01); *Y02D 70/444* (2018.01)

(56) References Cited

U.S. PATENT DOCUMENTS

| | | |
|---|---|---|
| 2011/0028157 A1 | 2/2011 | Larsen |
| 2013/0201916 A1 | 8/2013 | Kummetz et al. |
| 2013/0210457 A1 | 8/2013 | Kummetz |
| 2014/0253733 A1* | 9/2014 | Norem .................. H04N 5/225 348/159 |

OTHER PUBLICATIONS

International Search Authority, "International Search Report and Written Opinion for PCT Application No. PCT/US2014/061820", dated Jan. 19, 2015, pp. 18, Published in: WO.

* cited by examiner ns module configured to communicate facility control information with a first component of a facility control and monitoring system. The distributed antenna system can also include a signal processing module configured to convert the facility control information to a format transportable by the distributed antenna system. The distributed antenna system can be configured to transport the facility control information to a second component of the facility control and monitoring system and transport wireless communication information between a base station and a remote unit of the distributed antenna system. The remote unit can be configured to provide the wireless communication information within a coverage area.

In another aspect, a remote unit is provided. The remote unit can include an antenna interface configured to transmit wireless communication information within a coverage area. The remote unit can also include a communications module configured to communicate facility control information with a facility control node associated with a facility control center. The remote unit can also include a signal processing module, communicatively coupled to the antenna interface and the communications module. The signal processing module is configured to convert the facility control information to a format transportable by a distributed antenna system.

In another aspect, a method is provided. The method can include receiving, at a head-end unit, facility control information from a facility control center. The method can also include converting the facility control information to a format transportable by a distributed antenna system. The method can also include transmitting the multiplexed information to a remote unit for providing wireless communications coverage to a coverage area using the wireless communication information and for providing the facility control information to a facility control node associated with the facility control center.

TELECOMMUNICATIONS SYSTEM FOR TRANSPORTING FACILITY CONTROL DATA AND WIRELESS COVERAGE INFORMATION

CROSS-REFERENCE TO RELATED APPLICATION

This application is a U.S. National Stage Application of PCT Application Serial No. PCT/US2014/061820, filed Oct. 22, 2014, and titled "TELECOMMUNICATIONS SYSTEM FOR TRANSPORTING FACILITY CONTROL DATA AND WIRELESS COVERAGE INFORMATION", which claims the benefit of U.S. Provisional Application Ser. No. 61/980,631, filed Apr. 17, 2014 and titled "Distributed Antenna System for Managing Facility Control and Monitoring Systems," the contents of all of which are incorporated herein by reference.

TECHNICAL FIELD

The present disclosure relates generally to telecommunications systems and more particularly (although not necessarily exclusively) to distributed antenna systems that can interface with and manage facility control and monitoring systems while providing wireless communications in a cellular network or a public safety network or a similar communications network.

BACKGROUND

Modern facilities, such as buildings and stadiums, can have facility control and monitoring systems that include sensors distributed throughout these facilities to permit remote monitoring of the facility status by operators or computers at a central location. Facility control and monitoring systems can monitor various parameters, such as water pressure in sprinkler systems, temperature, fire alarms, air quality, personnel in various areas, and security devices (e.g., motion sensors and intrusion alarms). Additional facility control and monitoring devices can permit remote control of other facility infrastructure systems, such as lighting, ambient temperature, or controlled access to various areas.

In addition, facilities can include a distributed antenna system ("DAS"), which can include one or more head-end units and multiple remote units coupled to each head-end unit. A DAS can be used to extend wireless coverage in an area for mobile device users within the facility from external communication systems, such as cellular or personal communications service (PCS) mobile voice and data services and public safety land mobile radio systems. The DAS can provide wireless RF coverage throughout the entire building or part of the building.

Maintaining separate facility control and monitoring systems and a separate DAS may result in separate wired networks within the facility to route communications. For example, a security system, a fire alarm system, an elevator monitoring system, or a facility environmental monitoring system may be associated with separate wired networks within the facility to route control and sensor signals to a central controlling points. Multiple communications systems can lead to expensive installation costs and can make upgrading existing systems difficult.

SUMMARY

In one aspect, a distributed antenna system is provided. The distributed antenna system can include a communica-

DETAILED DESCRIPTION

Certain aspects and features relate to transporting information for wireless coverage and data for facility control and monitoring systems in a distributed antenna system ("DAS") such that having multiple communication systems in an area, such as a building, can be avoided. For example, the DAS can receive facility control and monitoring data from a facility control and monitoring system and can convert the facility control and monitoring data to a format in which the data can be transported in the DAS. For example, the DAS can combine the facility control and monitoring data with information from signals pertaining to wireless communications coverage in a cellular or a public safety network and the combined information and data can be transported by the DAS to respective destinations (e.g., the information to a remote unit for radiation by an antenna and the data to a facility control and monitoring system).

Modifying the DAS to communicate with facility control and monitoring systems can allow for seamless integration with building systems, such as emergency monitoring systems. For example, a DAS configured to manage facility control systems can be used to locate personnel in a facility during emergencies, such as fires. A facility control node, such as a building control sensor, may be connected to a communications port of a head-end unit or a remote unit and may be activated based on received facility control and monitoring data. For example, in the event that a fire alarm is detected, a facility control center that is a fire alarm system can send commands through the DAS to activate wireless sensors coupled to remote units. Activating wireless sensors at remote units can help determine whether any personnel are located in a building during a fire. Multiple remote units can receive the same commands from the facility control and monitoring center to improve location accuracy and to help reduce the ambiguity in position location.

Modifying the DAS to communicate with and manage various facility monitoring and control systems can permit a single wiring infrastructure to be used for both cellular and public safety network communications and facility infrastructure control and monitoring functions. Modifying the DAS can also permit easy expansion of existing facility control and monitoring systems as well as easing the addition of new systems.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
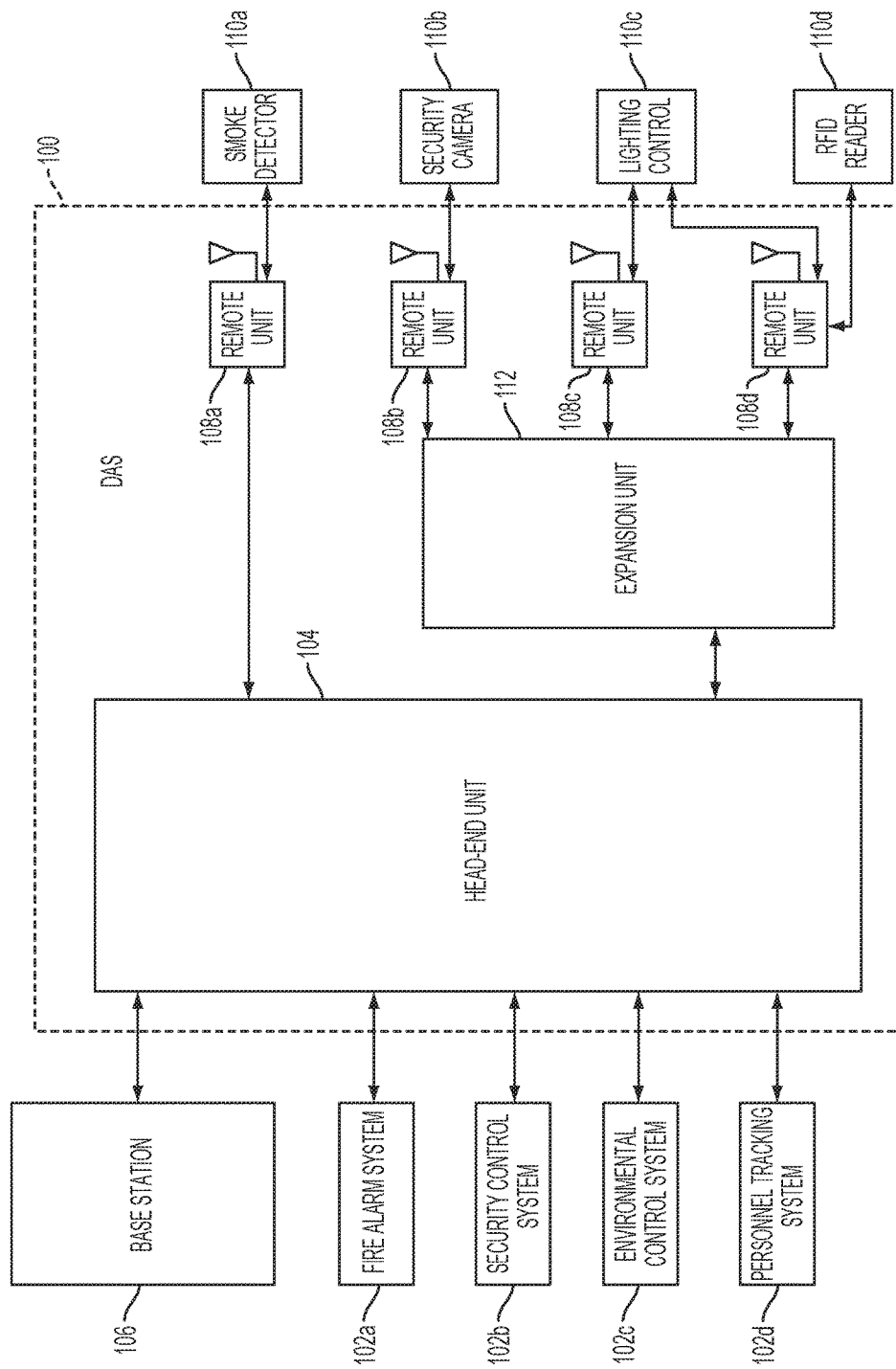
FIG. 1 is a block diagram of a distributed antenna system ("DAS") that can interface with and manage facility control and monitoring systems while providing wireless communications in a cellular network or a public safety network according to one aspect of the present disclosure.

FIG. 1 depicts an example of a DAS 100 that is designed to transport wireless communication information between a base station 106 and a network of spatially separated remote units 108*a-d* and also provide communication between components of facility control and monitoring systems via a head-end unit 104. Although various aspects and features are described with respect to a DAS, other types of telecommunications systems, such as a repeater, can be used instead or in addition to a DAS.

The head-end unit 104 can be communicatively coupled to one or more facility control centers 102*a-d*, such as a fire alarm system 102*a*, a security control system 102*b*, an environmental control system 102*c*, or a personnel tracking system 102*d*. While specific facility control centers 102*a-d* are depicted in FIG. 1 for illustrative purposes, any facility control center can be used. For example, other facility control centers can include a building access control system or an elevator monitoring system. The head-end unit can also be communicatively coupled to a base station 106, which can be a cellular base transceiver station for wireless standards such as GSM, LTE, CDMA, or UMTS or a system controller for a public safety network such as a public safety system or a medical telemetry system.

For providing wireless communications, the head-end unit 104 can receive downlink signals pertaining to wireless communications from the base station 106 and transmit uplink signals to the base station 106. Any suitable communication link can be used for communication between base stations and head-end units, such as (but not limited to) a direct connection or a wireless connection. A direct connection can include, for example, a connection via a copper, optical fiber, or other suitable communication medium. In some aspects, the head-end unit 104 can include an external repeater or internal RF transceiver to communicate with the base station 106. In some aspects, the head-end unit 104 can combine downlink signals received from different base stations. The head-end unit 104 can transmit the combined downlink signals to one or more of the remote units 108*a-d*.

In some aspects, the head-end unit 104 can be communicatively coupled to the remote units 108*b-d* via an expansion unit 112. In alternative aspects, the head-end unit 104 can be coupled to remote unit 108*a* directly without using expansion units or other intermediate devices.

The remote units 108*a-d* can provide wireless communications coverage by transmitting downlink signals to user equipment devices and receiving uplink signals from the user equipment devices. Remote unit 108*a* can transmit the uplink signals directly to the head-end unit 104. The expansion unit 112 can combine the uplink signals received from the remote units 108*b-d* and transmit the combined signal to the head-end unit 104. The head-end unit 104 can combine uplink signals received from the expansion unit 112 and the remote unit 108*a* for transmission to the base station 106.

FIG. 1 depicts a DAS 100 that communicates with one base station 106 and that includes a single head-end unit 104, a single expansion unit 112, and four remote units 108*a-d*. But a DAS according to other examples can communicate with any number of base stations and can include any suitable number of head-end units, expansion units, and remote units.

Along with providing wireless communications, the DAS 100 can also be configured to interconnect facility control centers 102*a-d* with associated facility control nodes 110*a-d*. For example, the fire alarm system 102*a* can be associated with a smoke detector node 110*a* by being designed to communicate with the smoke detector node 110*a*. Similarly, the security control system 102*b* can be associated with a security camera node 110*b* by being designed to communicate with the security camera node 110*b*. The environmental control system 102*c* can be associated with a lighting control node 110*c* by being designed to communicate with the lighting control node 110*c*. And the personnel tracking system 102*d* can be associated with an RFID reader 110*d* by being designed to communicate with the RFID reader 110*d*. Facility control nodes 110*a-d* and facility control centers 102*a-d* can communicate by transmitting facility control information, which can include any type of control information (e.g., operational commands and instructions) or monitoring information (e.g., sensor data, audio video feeds, etc.). For example, facility control centers 102*a-d* can provide facility control information in the form of commands to facility control nodes 110*a-d* to power on or off or activate certain features. Facility control nodes 110*a-d* can provide facility control information in the form of sensor data to facility control centers 102*a-d*.

The remote units 108a-d can be designed to communicate with the facility control nodes 110a-d. For example, remote unit 108a can communicate with a smoke detector node 110a. In the event a fire is detected, smoke detector node 110a is activated and the remote unit 108a can send information regarding the status of the smoke detector node (e.g., the level of smoke being detected by the smoke detector node 110a) to the head-end unit 104, which can route the information to the fire alarm system 102a. Similarly, remote unit 108b can communicate with a security camera node 110b. The security camera node 110b can transmit a video and audio feed to the remote unit 108b, which can transmit the video and audio data to the head-end unit 104. The head-end unit 104 can route the facility control information, in this example, the video and audio data, to the security control system 102b. As another example, remote units 108c-d can communicate with a lighting control node 110c. The lighting control node 110c can be configured to control multiple lights in the facility via commands from the environmental control system 102c. For example, a command from the environmental control system 102c to dim or brighten a particular light in the facility can be sent via the head-end unit 104 to the remote unit 108c or the remote unit 108d.

Facility control nodes can also include RFID readers used to monitor personnel and track building assets. In other aspects, RFID readers can be used to determine a time period when areas of the building are unoccupied and lights or other systems can be turned off or placed in a low power mode. For example, the remote unit 108d can be communicatively coupled to an RFID reader 110d. The RFID reader 110d can transmit scanned RFID tag information to the remote unit 108d. The remote unit 108d can send the facility control information (in this case, the RFID tag information) to the personnel tracking system 102d via the head-end unit 104.

Configuring the DAS 100 to interface with components of facility control and monitoring systems can allow for more flexible operation of the DAS 100. For example, information on environmental parameters in the coverage area from the components of facility control and monitoring systems can change a mode of operation of the DAS. The mode of operation can pertain to the wireless communication functions of the DAS 100. For example, the power mode of the DAS 100 as it provides wireless communication may depend on the status of certain environmental parameters, such as the number of lights on in the facility. If a designated light or a threshold number of lights are on, then the DAS 100 can be operated in full power mode. Conversely, if a designated light or threshold of lights are off, then the DAS 100 can be set to operate in a low power mode.

When configured to manage facility control centers 102a-d and facility control nodes 110a-d, the DAS 100 can obtain relevant information of the building, such as status of the number of lights on in the building, via the lighting control node 110c coupled to the remote unit 108c. The lighting control node 110c can provide information on the status of the sensors (e.g., how many lights are switched on) to the remote units 108c. Based on the status of the sensor, a remote unit 108a-d can change a mode of operation (e.g., switch itself to a low powered mode) or the head-end unit 104 can send an instruction to one or more remote units 108a-d to change the mode of operation.

While specific facility control nodes are depicted in FIG. 1 for illustrative purposes, other aspects can include any other node or sensor in a building system that is configured to interface with a DAS. For example, other facility control nodes can include a water pressure sensor, temperature sensor, air quality sensor, motion sensor, intrusion alarm, or ambient temperature sensor.

Figure 2:
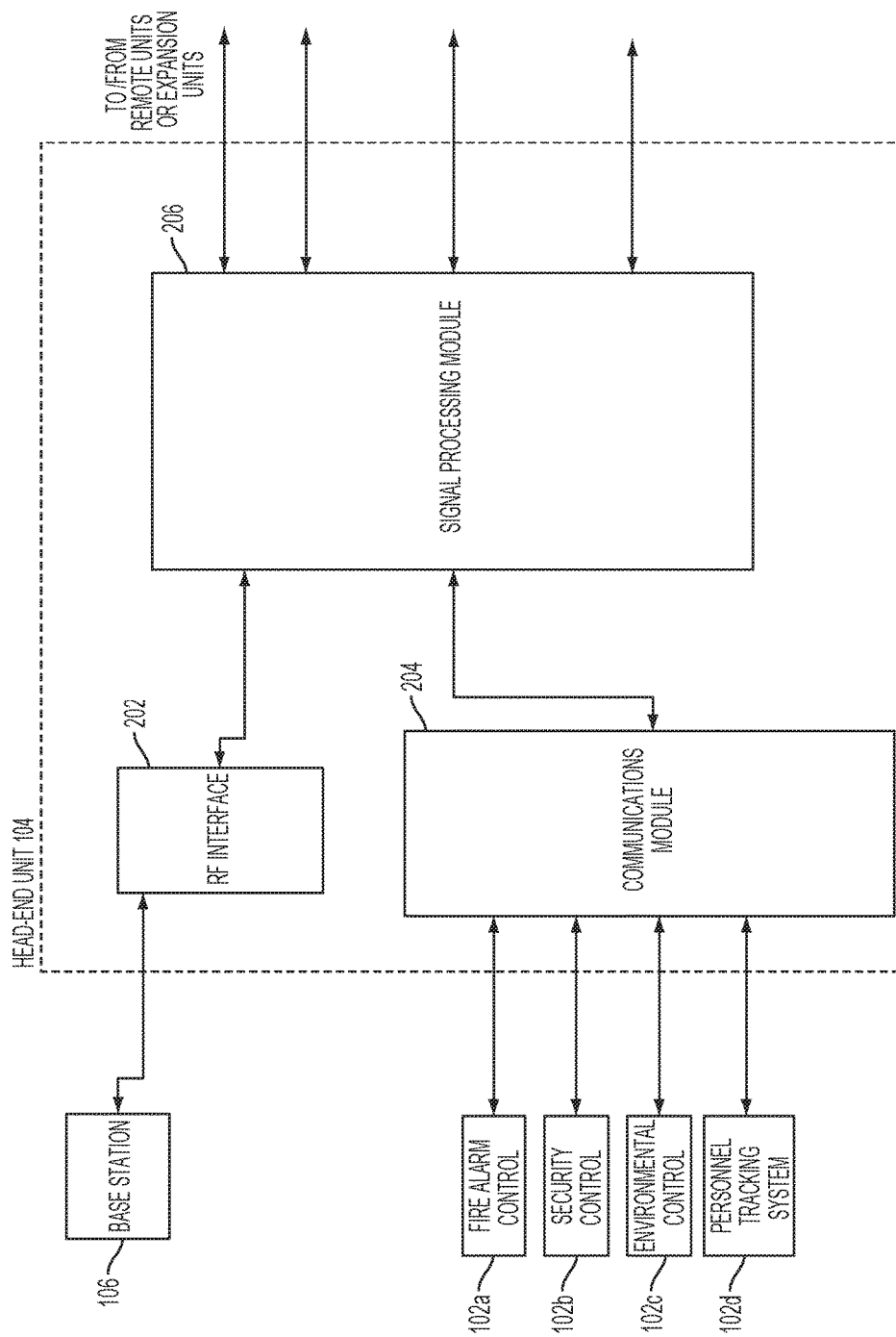
FIG. 2 is a block diagram of an example of a head-end unit of FIG. 1 according to one aspect of the present disclosure.
Figure 3:
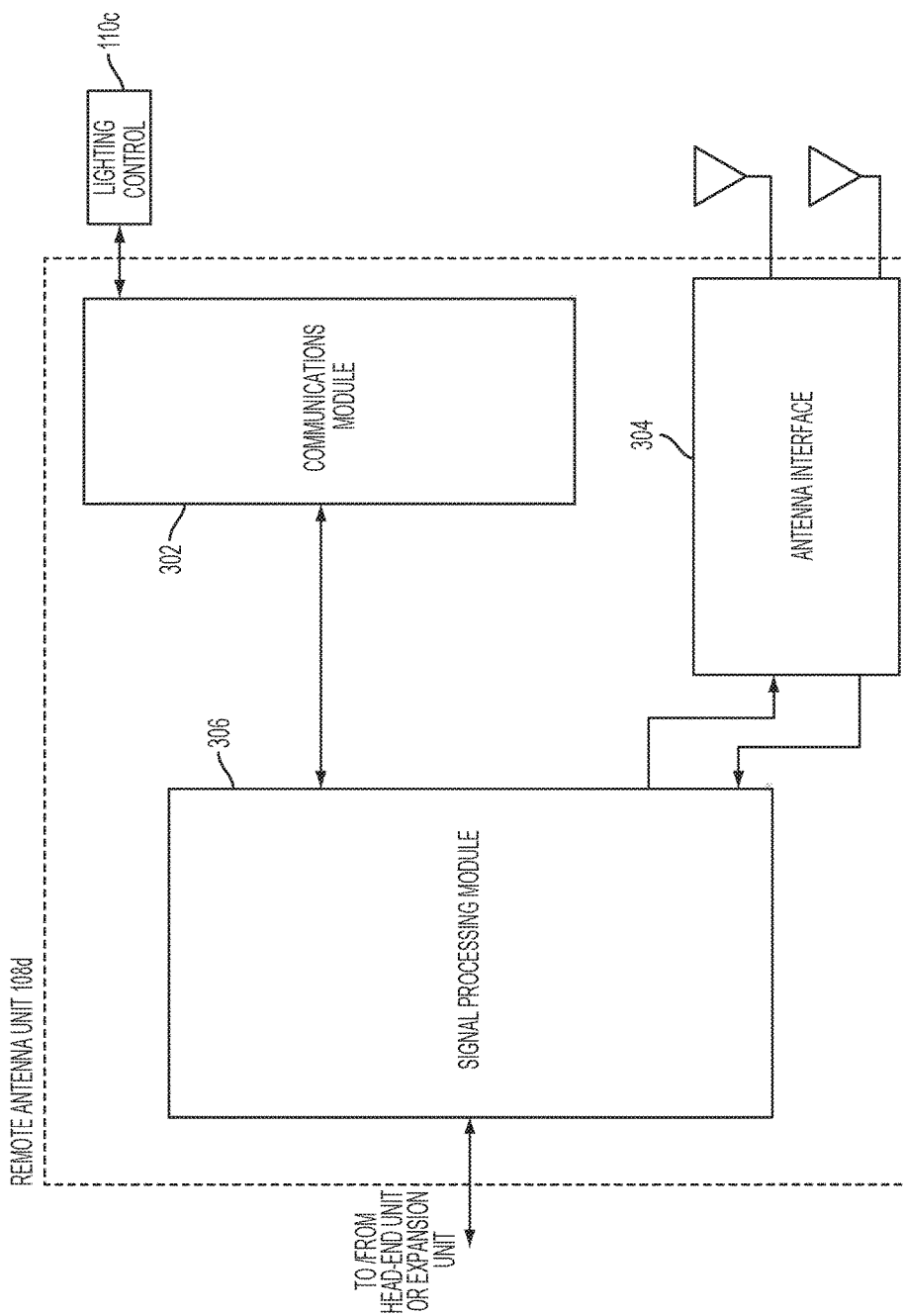
FIG. 3 is a block diagram showing an example of a remote unit of FIG. 1 according to one aspect of the present disclosure.

When a DAS is configured to manage the communications between components of facility monitoring and control systems, head-end units and remote units within the DAS can be configured to process the signals from the facility control nodes and facility control centers in order to transport the signals through the DAS. FIGS. 2-3 depict examples of a head-end unit and a remote unit configured to process the communications from components of facility control and monitoring systems.

FIG. 2 is an example of a block diagram of head-end unit 104 configured to communicate with multiple facility control centers 102a-d, which were described with respect to FIG. 1. Head-end unit 104 can include a communications module 204, which can include various facility control communications ports for interfacing with the facility control centers 102a-d. The facility control communications ports can be any port suitable for connecting to a wired, optical, wireless, or any other communications network. For example, the communications module 204 can include one or more Ethernet ports, RS-232 serial interfaces, USB interfaces, or digital optical ports for wired interfaces. The communications module 204 can also include RF transceivers for wireless communication with facility control centers. The communications module 204 can consist of a standard interface hub that can support multiple types of interface ports, such as a USB and Ethernet hub. Alternatively, the communications module 204 can consist of separate facility control communications ports built into the head-end unit 104. While FIG. 2 depicts communications module 204 as included in the head-end unit 104 for illustrative purposes, in other aspects, communication interfaces for communicating between the head-end unit and facility control centers can be located separately as a switch external to the head-end unit 104. The multiple communication ports in the communications module 204 can allow the head-end unit 104 to communicate with a wide variety of facility control centers 102a-d of differing communication protocols.

Along with communicating with multiple facility control centers, the head-end unit 104 can also provide wireless communications via mobile voice information and mobile data information to multiple remote units. The head-end unit 104 can thus allocate bandwidth in the uplink and downlink data channels between various remote units and expansion units for transport of the facility control information, mobile voice information, and mobile data information For example, head-end unit 104 can receive and transmit wireless signals with the base station 106 via an RF interface 202. The RF interface 202 can include a standard RF transceiver for receiving downlink wireless RF signals from the base station 106 and converting the downlink signals to a digital sequence of ones and zeroes through an analog to digital converter. The RF interface 202 can also include a digital to analog converter for converting digital uplink signals received from remote units to analog RF signals for transport to the base station 106.

The head-end unit 104 can include a signal processing module 206, which can prepare facility control information provided from the communications module 204 for transportation to remote units by converting the facility control information to the format used in the DAS. The format of the facility control information can depend on the communications protocol used by the components of the facility control and monitoring system. For example, analog video cameras can send analog video and audio information to the communications module 204. The signal processing module 206 can convert the received analog video and audio information to a digital format transportable by the DAS. In another example, a facility control center can provide facility control information as a single bit pulse control modulated ("PCM") signal. The signal processing module 206 can convert the PCM signal to a digital signal transportable in the DAS.

The signal processing module 206 can also receive signals carrying downlink mobile voice information and mobile data information from the RF interface 202 and combine the mobile voice information and mobile data information with the facility control information. According to one aspect, framers can be included in the signal processing module 206. Framers can be configured to multiplex mobile data information, mobile voice information, and facility control information into a downlink stream. The signal processing module 206 can then route the multiplexed information to the appropriate output channel for transmission to the appropriate remote unit.

For example, the environmental control system 102c can turn off all lighting in a building at a certain point of time, such as after the close of business. The environmental control system 102c can prepare facility control information informing lighting control devices within the building to turn off connected light switches. The communications module 204 in the head-end unit 104 can receive the facility control information from the environmental control system 102c via, for example, an Ethernet interface, and provide the facility control information to the signal processing module 206. The signal processing module 206 can determine, from information in the facility control information, which remote unit or expansion unit should receive the facility control information in order to route the facility control information to lighting control nodes. The signal processing module 206 can also receive downlink mobile voice information and downlink mobile data information from the base station 106 via the RF interface 202. The signal processing module 206 can multiplex the signals carrying facility control information from the environmental control system 102c with the downlink voice information and downlink data information intended for the remote unit that is coupled to the lighting control device node. The signal processing module 206 can then route the multiplexed information to the appropriate downlink port in order to transmit the multiplexed information to the remote unit or expansion unit.

In addition to receiving downlink communications, the signal processing module 206 can also receive uplink communications from expansion units and remote units. According to one aspect, the uplink communications from remote units and expansion units may include a multiplexed signal that includes uplink voice information and uplink data information as well as facility control information sent from facility control nodes. The signal processing module 206 can include de-framers configured to de-multiplex the uplink data streams received from remote units into uplink mobile data information, mobile voice information, and facility control information. The signal processing module 206 can route the mobile data information and mobile voice information for transmission to the base station 106. The signal processing module 206 can also route the facility control information to the appropriate communications port in the communications module 204 for transmission to the appropriate facility control center.

For example, a security camera communicatively coupled to a remote unit in the DAS may be transmitting a live security feed to the security control system 102b, which could be a central security server that receives live feeds from security cameras throughout the building. The signal processing module 206 can receive uplink signals from a remote unit or an expansion unit. The uplink signals can include a multiplexed signal that includes uplink voice information and uplink data information intended for the base station 106 as well as a live security camera video feed (which includes facility control information) from a security camera node coupled to a remote unit. The signal processing module 206 can utilize de-framers to de-multiplex the uplink signal into signals carrying the respective uplink voice information, uplink data information, and facility control information. The signal processing module can provide the uplink voice and uplink data pertaining to DAS wireless coverage to the RF interface 202 for transmission to base station 106. Similarly, the signal processing module 206 can determine, from the facility control information, the appropriate facility control center that is associated with the facility control node that sent the transmission. The signal processing module 206 can route the facility control information (in this example, the live video feed) to the appropriate port in the communications module 204 for transmission to the security control system 102b.

In one aspect, the signal processing module 206 can be designed to prioritize mobile voice information, mobile data information, or the facility control information that is communicated through the DAS 100. For example, if a mobile user is engaged in an ongoing voice communications call, facility control information may be transmitted through the DAS 100 at the same time as the ongoing voice call. The signal processing module 206 can prioritize the mobile voice information pertaining to the ongoing voice call by allocating dedicated bandwidth in the DAS 100 for the voice information. Prioritization can reduce the likelihood of experiencing a degradation of call quality due to bandwidth restrictions. In another example, facility control information can be prioritized over wireless communication information when the facility control information pertains to building security or safety of personnel in the building. For example, if an intrusion alarm sensor is activated, indicating a building intruder, the facility control information can be prioritized to ensure that the information regarding the location and status of the intrusion reaches a facility control center, such as a security center.

Any suitable method for prioritization of the mobile voice information, mobile data information and facility control information is possible, such using Quality of Service protocols or other prioritization technologies.

The signal processing module 206 can be implemented using any suitable processing device, including a field-programmable gate array ("FPGA"), a microprocessor, a peripheral interface controller ("PIC"), an application-specific integrated circuit ("ASIC"), or other suitable processor. The use of programmable devices such as an FPGA can allow for software configuration of the framers and de-framers, allowing the DAS to transfer data to and from a wide variety of devices via appropriate ports based on the position of the data in each frame with little cost impact on the DAS.

Figure 5:
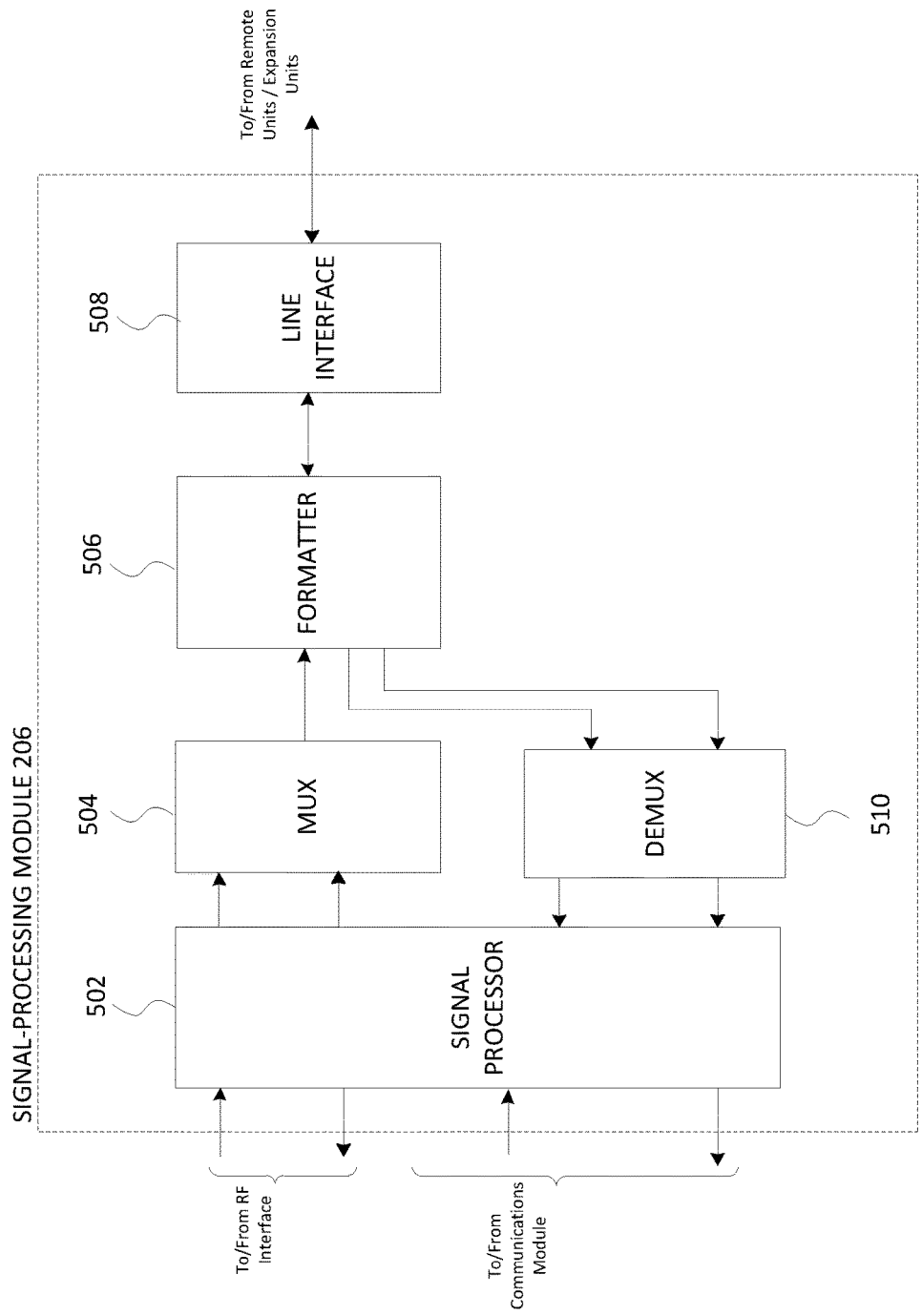
FIG. 5 is a block diagram showing an example of a signal processing module in a head-end unit according to one aspect of the present disclosure.

FIG. 5 is a block diagram depicting an example of the signal processing module 206. The signal processing module 206 can include a signal processor 502, multiplexer 504, formatter 506, line interface 508, and a de-multiplexer 510. The signal processor can be implemented using a digital signal processor ("DSP"), FPGA, or other suitable processing device. Wireless communication signals converted to a digital format via the RF interface 202 can be provided to the signal processor 502. The signal processor 502 can adjust the gain of the wireless communication signal, apply any necessary signal filtering to attenuate residual noise, and adjust the sampling rate as needed for transport in the DAS. Facility control information received by the communications module 204 can also be provided to the signal processor 502. The signal processor 502 can convert the facility control information to a format transportable by the DAS. For example, if the facility control information is in an analog format, the signal processor 502 can convert the analog data to a digital format transportable in the DAS.

The processed wireless signal and converted facility control information can be two inputs into the multiplexer 504. The multiplexer 504 can multiplex the two signals and provide the combined signal to the formatter 506.

The formatter 506 can include framers for processing the information on the multiplexed signal into transportable frames. For example, for a 10 Gbps Ethernet connection to the remote units, the formatter 506 can allocate a pre-determined number of bytes to each 10 Gbps Ethernet frame, the additional bytes allocated for carrying the facility control information. The formatter 506 can then add the wireless communication information and the facility control information to the 10 Gbps Ethernet frame. In some aspects, the multiplexer 504 can be included as part of the formatter 506, such that wireless communication information processed by signal processor 502 and facility control information received by the communications module 204 are multi-plexed and formatted into transportable downlink frames by the formatter 506.

The formatted downlink frames, carrying both the wireless communication information and the facility control information, can be provided to a line interface 508. The line interface 508 can include the necessary interface for connecting to remote units or expansion units. For example, the line interface 508 can include a PHY module and Ethernet interface if the DAS signals are being transported in a 10 Gbps Ethernet connection. In other aspects, the line interface 508 can include optical transmit and receive ports, RS-485 serial transmitter and receiver, or a wireless interface for providing signals wirelessly to the remote units or expansion units. The line interface 508 can thus provide the multiplexed downlink frames carrying both wireless communication information and facility control information to remote units or expansion units.

When uplink signals are received from remote units or expansion units, the uplink signals can include frames containing both wireless communication information and facility control information. Along with framers, the formatter 506 can also include de-framers for processing uplink frames received from remote units and expansion units, extracting the facility control information and the wireless communication information from the uplink frames. The formatter 506 can provide the de-framed wireless communication information and facility control information to the de-multiplexer 510 as a serial stream of digital data. The de-multiplexer 510 can separate the wireless communication information from the serial stream of data and provide the wireless communication information to the signal processor 502 for any necessary gain control or sampling rate adjustment. The signal processor 502 can then provide the uplink wireless communication information to the RF interface 202 for communication to the base station 106.

The de-multiplexer 510 can also separate the facility control information and provide the facility control information to the signal processor 502. The facility control information can include data identifying the appropriate facility control center 102a-d that should receive the transmission. The signal processor 502 can detect the identifying data in order to route the facility control signal to the appropriate facility control center 102a-d. The signal processor 502 can also convert the facility control information to a format recognizable by the facility control center 102a-d. For example, if the appropriate facility control center communicates via analog signals, the signal processor 502 can convert the digital facility control information from the de-multiplexer 610 to an analog signal. The signal processor 502 can provide the converted facility controls signal to the appropriate output port of the communications module 204 for transport to the appropriate facility control center 102a-d based on the detected identifier.

The functionality of the communications module 204 and the signal processing module 206 can also be implemented in a remote unit for communication with facility control nodes. FIG. 3 is a block diagram depicting an example of remote unit 108c, which is configured for providing wireless communications to a coverage area as well as providing communications to and from a facility control node coupled to the remote unit 108c. Specifically, the remote unit 108c can be communicatively coupled to a lighting control node 110c. While the facility control node depicted in FIG. 3 is a lighting control node 110c, remote units can be coupled to any suitable facility control node as discussed above.

Remote unit 108c can communicate facility control information to and from the lighting control node 110c via a communications module 302, which, similar to the communications module 204, can include various facility control communications ports as described with respect to FIG. 2.

The remote unit 108c can also transmit and receive wireless communication signals carrying mobile voice information and mobile data information to user equipment devices in a coverage area via an antenna interface 304. The antenna interface 304 can include a transmit antenna and a receive antenna that are physically separated. Alternatively, the antenna interface 304 can include one shared transmit/receive antenna. The antenna interface 304 can also include an RF interface to convert uplink RF waveforms to digital signals for input to a signal processing module 306. Additionally, the antenna interface 304 can include circuitry for converting downlink signals received from the signal processing module 306 to downlink RF waveforms for transmission.

The signal processing module 306 can prepare facility control information provided from the communications module 302 for transportation to a head-end unit or expansion unit by converting the facility control information to the format used in the DAS. The signal processing module 306 can also receive the uplink wireless communication signals carrying mobile voice information and mobile data information from the antenna interface 304 and combine the mobile voice information, mobile data information, and the facility control information. Similar to the signal processing module 206, the signal processing module 306 can include framers to multiplex mobile data information, mobile voice information, and facility control information into an uplink data stream provided to the head-end unit or expansion unit.

For example, the lighting control node 110c can be designed to provide a signal containing information indicating the status of any connected lighting (e.g., if the lighting in the facility is on or off). The facility control information (in this example, status of any connected lighting) can be provided to the remote unit 108c via the communications module 302. The communications module 302 can provide the facility control information to the signal processing module 306. The signal processing module 306 can multiplex the facility control information with uplink voice information and uplink data information received by the antenna interface 304 and transmit the multiplexed information to the head-end unit. As discussed above with respect to FIG. 2, the head-end unit will de-multiplex the received signal and route the facility control information to the facility control center associated with the lighting control node 110c.

In addition to processing uplink signals, downlink signals provided to the remote unit 108c from a head-end unit or expansion unit can be received by the signal processing module 306. The signal processing module 306 can de-multiplex the downlink wireless communication signal into signals carrying facility control information, downlink mobile voice information, and downlink mobile data information. The signal processing module 306 can then route the received facility control information to the appropriate communications port in the communications module 302 for transmission to the lighting control node 110c (the appropriate facility control node associated with the facility control center that transmitted the signal). The signal processing module 306 can route the de-multiplexed signals carrying mobile voice information and mobile data information to the antenna interface 304 in order to provide wireless coverage.

For example, the environmental control system 102c discussed with respect to FIG. 2 may send a command to turn off all lighting in the building. The signal processing module 306 can receive downlink signals from the head-end unit or expansion unit and de-multiplex the downlink signals into signals carrying downlink mobile voice information, mobile data information, and facility control information. The signal processing module 306 can route the facility control information (in this case, the command instructing lighting to switch off) to the appropriate port in the communications module 302. The facility control information can then be transmitted to the lighting control node 110c, which can switch off lighting in the facility per the instructions from the environmental control system 102c. The signal processing module 306 can also provide the downlink mobile voice information and mobile data information to the antenna interface 304 for transmission to user equipment devices in the coverage zone.

Similar to the signal processing module 206, the signal processing module 306 can also be designed to prioritize mobile voice information, mobile data information, and facility control information in the same manner as discussed above.

Figure 6:
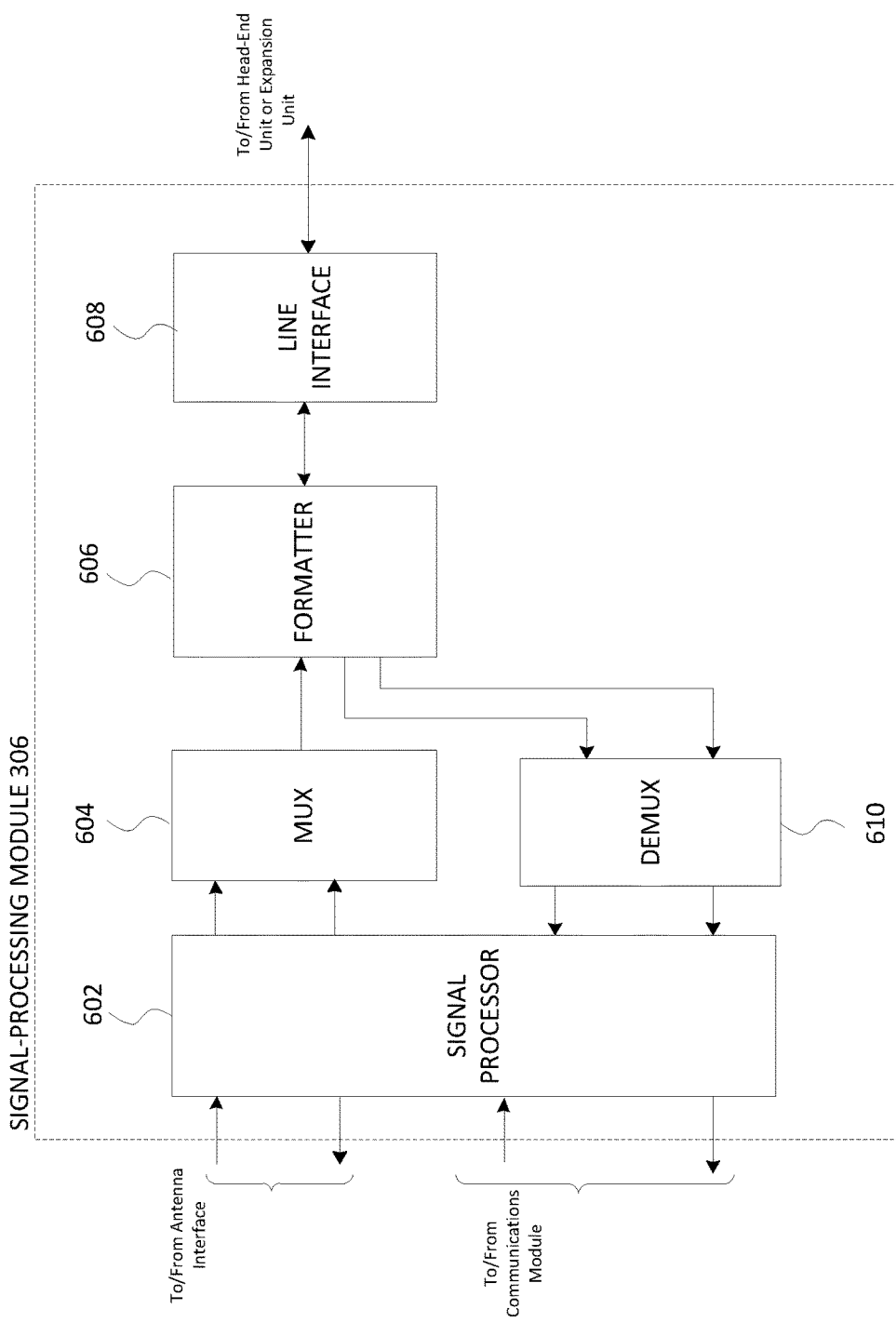
FIG. 6 is a block diagram showing an example of a signal processing module in a remote unit according to one aspect of the present disclosure.

FIG. 6 is a block diagram depicting an example of the signal processing module 306 that can be included in a remote unit. The signal processing module 306 can include a signal processor 602, a multiplexer 604, formatter 606, line interface 608, and de-multiplexer 610, all of which can operate in a similar manner to the signal processor 502, multiplexer 504, formatter 506, line interface 508, and de-multiplexer 510 described previously in connection with FIG. 5.

For example, downlink signals transmitted by the head-end unit or expansion unit can be provided to the signal processing module 306 via the line interface 608. The downlink signals, which can carry both wireless communication information and facility control information, can be provided to the formatter 606. The formatter 606 can include de-framers for processing downlink frames received from the head-end unit or expansion unit, extracting the facility control information and wireless communication information from the downlink frames. The formatter 606 can provide the de-framed wireless communication information and facility control information to the de-multiplexer 610.

In turn, the de-multiplexer 610 can provide the wireless communication information to the signal processor 602 for any necessary gain control or sampling rate adjustment. The signal processor 602 can provide the downlink wireless communication information to the antenna interface 304 for communication to user equipment devices within the coverage area. The de-multiplexer 610 can also provide the facility control information to the signal processor 602. Based on information included in the facility control information, the signal processor 602 can identify the appropriate facility control node that should receive the facility control information. The signal processor 602 can also convert the facility control information to a format used by the facility control node. For example, if the facility control node that should receive the facility control information communicates using an analog interface, the signal processor 602 can convert the digitized facility control information (digitized for distribution through the DAS) to the appropriate analog format. The signal processor 602 can then provide the facility control information to the communications module 302 for transport to the appropriate facility control node.

Uplink wireless communication information provided by user equipment devices can be received by the antenna interface 304 and provided to the signal processor 602 in the signal processing module 306. After performing any necessary gain control, filtering, and sampling rate adjustment, the uplink wireless communication information can be provided as the first of two inputs to the multiplexer 604. Facility control information received by the communications module 302 can be provided to the signal processor 602. The signal processor 602 can convert the facility control information to a format transportable by the DAS, as described above with respect to signal processor 502. The converted facility control information can be provided as the second input into the multiplexer 604. The multiplexer 604 can combine the wireless communication information and facility control information and provide the combined data stream to the formatter 606. The formatter 606, in turn, can process combined data stream into uplink data frames transportable in the DAS. The uplink data frames, carrying both wireless communication information and facility control information, can be transmitted to the head-end unit or expansion unit via the line interface 608.

While FIGS. 2-3 and 5-6 depict the communications modules 204, 302 and the signal processing modules 206, 306, as included in the head-end unit 104 and remote unit 108c, in other aspects, functionality of the communications module and signal processing module can be distributed through the DAS. For example, a dedicated facility control and monitoring module can be added as a component in the DAS in order to provide the functionality of the signal processing modules 206, 306. Similarly, an external switch or connection hub can be used in the DAS to receive and transmit communications between the facility control centers and facility control nodes.

Figure 4:
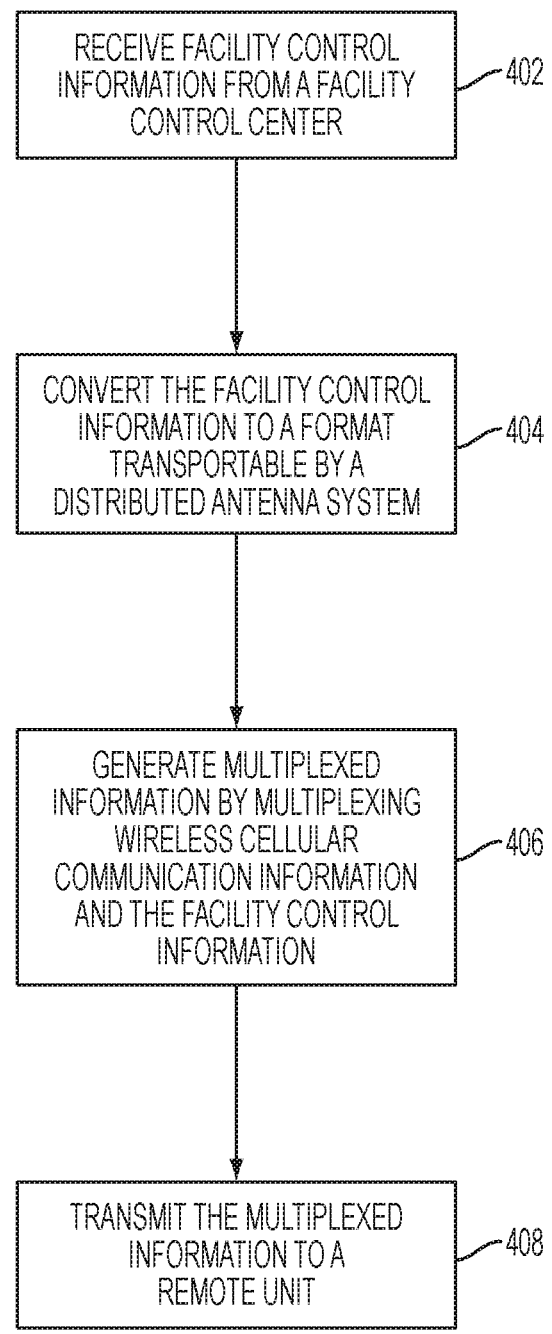
FIG. 4 is a flow chart depicting an example of a process for using a DAS to provide communications between a facility control center and facility control nodes associated with the facility control center according to one aspect of the present disclosure.

FIG. 4 is a flow chart depicting an example of a process for using a DAS to provide communications between a facility control center and facility control nodes associated with the facility control center according to one aspect of the present disclosure.

In block 402, a head-end unit can receive facility control information from a facility control center. For example, head-end unit 104 can receive facility control information from a fire alarm system 102a, security control system 102b, environmental control system 102c, personnel tracking system 102d, or other facility control center via a communications module 204. The facility control information can provide control information or various commands to facility control nodes associated with the facility control centers. For example, fire alarm system 102a can have associated smoke detector nodes coupled to remote units. Fire alarm system 102a can transmit command information to a smoke detector node 110a pinging the status of the smoke detector node 110a. As another example, security control system 102b can have an associated security camera node 110b coupled to a remote unit 108b. The security control system 102b can send facility control information containing commands instructing the security camera node 110b to change direction of recording or zoom in or out on a particular location.

In block 404, facility control information can be converted to a format transportable by a DAS. A signal processing module 206 can process the signals in software. For example, the signal processing module 206 can convert facility control information transported as a single bit serial PCM signal to a digital format transportable by the DAS. In another aspect, the communications module 204 can include hardware for converting incoming analog facility control information to a digital signal for transport in the DAS. For example, the communications module 204 can include analog to digital converters configured to digitize facility control information being transmitted in an analog format.

In block 406, the signals carrying facility control information can be multiplexed with signals carrying wireless communication information for the DAS. A framer in the head-end unit can be configured to multiplex the signals. Alternatively, the signal processing module 206 can be configured to multiplex the signals in software. For example, the signal processing module 206 can allocate a pre-determined number of bytes of information in each data frame carrying digital DAS signals. If DAS signals are being transmitted via a 10G BASE-T (10 Gbps) Ethernet protocol, the signal processing module 206 can allocate bytes of information to each 10 Gbps Ethernet frame. The signal processing module 206 can multiplex the digitized facility control information by adding the facility control information into the allocated bytes in the data frames. The signal processing module 206 can also insert identifier information for the facility control information into the data frame so that the recipient remote unit detect and de-multiplex the facility control information out of the data frame.

In block 408, the multiplexed information is transmitted to a remote unit. Specifically, the multiplexed information is transmitted to the remote unit for providing wireless communications coverage to a coverage area and for providing the facility control information to a facility control node associated with the facility control center. For example, the head-end unit can transmit the multiplexed information to a remote unit. The signal processing module 306 in the remote unit can de-multiplex the information into facility control information and wireless communication information. The signal processing module 306 in the remote unit can also convert the facility control information back to the format compatible with the facility control and monitoring system. The remote unit can route the de-multiplexed facility control information to the appropriate facility control node associated with the facility control center that provided the facility control information. The remote unit can also use the wireless communication information to provide wireless coverage to the coverage area.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A distributed antenna system, comprising:
    a communications module comprising one or more facility control communication ports configured to communicate facility control information with a first component of a facility control and monitoring system; and
    a signal processing module comprising a signal processor configured to convert the facility control information to a format transportable by the distributed antenna system,
    wherein the distributed antenna system is configured to transport the facility control information to a second component of the facility control and monitoring system and transport wireless communication information between a base station and a remote unit of the distributed antenna system, the remote unit being configured to provide the wireless communication information within a coverage area;
    a head-end unit communicatively coupled to the remote unit and configured to transport the facility control information between a facility control center and the remote unit, wherein the signal processing module and the communications module are included in the head-end unit, and wherein the remote unit is configured to transport the facility control information between the head-end unit and a facility control node associated with the facility control center;
    wherein the facility control node is configured to detect an environmental parameter within the coverage area and provide the environmental parameter to the remote unit, wherein the remote unit is configured to provide the environmental parameter to the head-end unit, and wherein the head-end unit is configured to change a mode of operation of the distributed antenna system, based on the environmental parameter, with respect to wireless communication coverage.

2. The distributed antenna system of claim 1, wherein the signal processing module is further configured to multiplex the wireless communication information and the facility control information.

3. The distributed antenna system of claim 1, wherein the first component of the facility control and monitoring system comprises a security camera node configured to provide a security video feed to the second component of the facility control and monitoring system, and wherein the second component of the facility control and monitoring system comprises a security control system configured to receive the security video feed and send commands to the security camera node.

4. The distributed antenna system of claim 1, wherein the first component of the facility control and monitoring system comprises a smoke detector node configured to provide smoke detection information to the second component of the facility control and monitoring system, and wherein the second component of the facility control and monitoring system comprises a fire alarm system configured to receive the smoke detection information and send commands to the smoke detector node.

5. The distributed antenna system of claim 2, wherein the wireless communication information comprises mobile voice information and mobile data information, and wherein the signal processing module is configured to prioritize the mobile voice information during an active voice call.

6. The distributed antenna system of claim 1, wherein the environmental parameter comprises information on a status of lighting units in the coverage area, and wherein the head-end unit is configured to change the mode of operation of the distributed antenna system by setting the distributed antenna system to a low power mode when the status the lighting units indicates that the lighting units are powered off.

7. A remote unit, comprising:
an antenna interface configured to transmit wireless communication information within a coverage area;
a communications module comprising one or more facility control communication ports configured to communicate facility control information with a facility control node associated with a facility control center; and
a signal processing module, communicatively coupled to the antenna interface and the communications module, the signal processing module comprising a signal processor configured to convert the facility control information to a format transportable by a distributed antenna system;
wherein the facility control node is configured to detect an environmental parameter within the coverage area and provide the environmental parameter to the remote unit, wherein the remote unit is configured to provide the environmental parameter to a head-end unit communicatively coupled to the remote unit, and wherein the head-end unit is configured to change a mode of operation of the distributed antenna system, based on the environmental parameter, with respect to wireless communication coverage.

8. The remote unit of claim 7, wherein the signal processing module is further configured to multiplex the wireless communication information and the facility control information into multiplexed information and transmit the multiplexed information to a head-end unit of the distributed antenna system.

9. The remote unit of claim 8, wherein the head-end unit is configured to de-multiplex the multiplexed information into the wireless communication information and the facility control information, transmit the facility control information to the facility control center, and transmit the wireless communication information to a cellular network or a public safety network.

10. The remote unit of claim 7,
wherein the facility control node comprises a security camera node configured to provide a security video feed to the facility control center, and wherein the facility control center comprises a security control system configured to receive the security video feed and send commands to the security camera node.

11. The remote unit of claim 10,
wherein the facility control node comprises a smoke detector node configured to provide smoke detection information to the facility control center, and wherein the facility control center comprises a fire alarm system configured to receive the smoke detection information and send commands to the smoke detector node.

12. The remote unit of claim 8, wherein the wireless communication information comprises mobile voice information and mobile data information, and wherein the signal processing module is configured to prioritize the mobile voice information during an active voice call.

13. The remote unit of claim 7, wherein the environmental parameter comprises information on a status of lighting units in the coverage area, and wherein the head-end unit is configured to change the mode of operation of the distributed antenna system by setting the distributed antenna system to a low power mode when the status of the lighting units indicates that the lighting units are powered off.

14. A method, comprising:
receiving, at a head-end unit, facility control information from a facility control center;
converting the facility control information to a format transportable by a distributed antenna system;
generating multiplexed information by multiplexing wireless communication information and the facility control information; and
transmitting the multiplexed information to a remote unit for providing wireless communications coverage to a coverage area using the wireless communication information and for providing the facility control information to a facility control node associated with the facility control center;
receiving, at the remote unit, an environmental parameter from the facility control node;
transmitting the environmental parameter to the head-end unit;
based on the environmental parameter, changing a mode of operation of the distributed antenna system with respect to wireless communication coverage.

15. The method of claim 14, further comprising:
prioritizing the wireless communication information over the facility control information during an active voice call.

16. The method of claim 14, further comprising,
prioritizing the facility control information over the wireless communication information when the facility control information includes information relating to building security.

* * * * *